United States Patent [19]

Nemoto et al.

[11] Patent Number: 5,034,765
[45] Date of Patent: Jul. 23, 1991

[54] FOCAL-PLANE SHUTTER

[75] Inventors: Ichiro Nemoto; Takahito Otora, both of Yotsukaido, Japan

[73] Assignee: Seikosha Co., Ltd., Japan

[21] Appl. No.: 557,302

[22] Filed: Jul. 23, 1990

[30] Foreign Application Priority Data

Jul. 28, 1989 [JP] Japan .................................. 1-88903

[51] Int. Cl.$^5$ .............................................. G03B 9/40
[52] U.S. Cl. .................................................. 354/246
[58] Field of Search ................ 354/246, 247, 248, 249

[56] References Cited

U.S. PATENT DOCUMENTS 4,054,891 10/1977 Onda et al. ............................ 354/46

Primary Examiner—Michael L. Gellner
Attorney, Agent, or Firm—Bruce L. Adams; Van C. Wilks

[57] ABSTRACT

A focal-plane shutter for use in a camera. The shutter has a driving lever which can be driven with a substantially uniform force. The shutter comprises a closing member for actuating closing blades, the driving lever that urges the closing member to perform an exposure operation, a tension spring connecting the driving lever with the closing member, a brake lever, and an anchoring lever. The brake lever has a retaining portion that retains the closing member in its exposure end position. The anchoring lever has an anchoring portion which, when the closing member is in its exposure end position, moves out of the operating range of the closing member.

3 Claims, 8 Drawing Sheets

FOCAL-PLANE SHUTTER

FIELD OF THE INVENTION

The present invention relates to a focal-plane shutter for use in a camera and, more particularly, to a focal-plane shutter consisting of an opening shutter blade unit and a closing shutter blade unit to open and close the shutter opening of a camera.

BACKGROUND OF THE INVENTION

A conventional focal-plane shutter as disclosed in Japanese Patent Publication No. 21536/1984 is shown in FIGS. 8 and 9. This shutter comprises an opening shutter blade unit and a closing shutter blade unit. The opening shutter blade unit has two shutter blades 101 and 102. The closing shutter blade unit has two shutter blades 103 and 104. Before the shutter release (not shown) of a camera in which this shutter is installed is operated, the shutter opening 105 is covered with these two shutter blade units as shown in FIG. 8 to pervent light coming from the camera lens from leaking toward the surface of the loaded film. When the shutter release is operated, the closing shutter blade unit is once activated and placed above and beside the shutter opening 105 to open it. Subsequently, the opening 105 is opened by the shutter blade 101 of the opening shutter blade unit. Then, the opening 105 is closed by the shutter blade 103 of the closing shutter blade unit.

A mechanism for driving the above-described closing shutter blade unit is shown in FIG. 9, where a closing lever 106 having a first engagement pin 106a engaging with the closing shutter blade unit is rotatably mounted on a support plate 107. The closing lever 106 further includes a second engagement pin 106b. An anchoring lever 108 undergoing the pulling force of a first tension spring 111 is so disposed that the lever can engage the first engagement pin 106a of the closing lever 106. When the anchoring lever 108 is rotated to the left, it disengages from the closing lever 106.

The closing lever 106 has a driving lens 109 which can engage the second engagement pin 106b. A first tension spring 110 is stretched between the driving lever 109 and the closing lever 106. A third tension spring 112 producing a stronger force than the first tension spring 110 is mounted on the driving lever 109.

First, the anchoring lever 108 engages the closing lever 106 to rotate the driving lever 109 to the left. Thus, the driving lever 109 is held in position. Then, the anchoring lever 108 is rotated to the left to disengage the anchoring lever 108 from the closing lever 106. The lever 106 is urged to rotate to the left by the first tension spring 110. The closing shutter blade unit is placed in the aforementioned position to open the shutter opening 105. These members may be driven manually. In recent years, it has been in common practice to drive them with a small-sized motor.

In this conventional focal-plane shutter, the closing shutter blade unit that closes the shutter opening 105 must be once driven so as to open it. For this purpose, the driving lever 109 must be rotated to the left. Prior to this rotation, the anchoring lever 108 is allowed to turn to the left and engage the first engagement pin 106a, in order to prevent the closing lever 106 from interlocking with the driving lever 109 via the first tension spring 110. Thereafter, the driving lever 109 is rotated to the left momentarily against the biasing force of the stronger third tension spring 112 and held in position.

Let P be the force needed to hold the anchoring lever 108 and the driving lever 109 in position. Let Q be the stroke traveled by the levers until they are held in position. The relation of the force P to the stroke Q is shown in FIG. 10. Specifically, the anchoring lever 108 engages the first engagement pin 106a at a point $Q_1$. Before this point $Q_1$ is reached, the force P is small, since it is only necessary to release the lever 108. Then, the driving lever 109 is rotated to the left and held in a point $Q_2$. For this purpose, the lever 109 must be moved to the left momentarily against the strong biasing force of the third tension spring 112 and, therefore, the force P must be made larger.

In this way, the force P increases suddenly between the positions $Q_1$ and $Q_2$ during the stroke. Where a small-sized motor is used to drive the levers, if the battery is consumed to such an extent that the peak of the force P between the positions $Q_1$ and $Q_2$ is slightly less than the force produced by the motor, then this system cannot cope with this peak. Therefore, it is impossible to drive the driving lever 109 until it is held in position. Where the levers are driven manually, the force P increases suddenly at an intermediate position between the positions $Q_1$ and $Q_2$ before the peak is reached. Hence, a queer feeling is given to the operator's hand.

SUMMARY OF THE INVENTION

It is an object of the present invention to provide a focal-plane shutter free of the foregoing problems.

The above object is achieved by a focal-plane shutter having opening blades and closing blades which successively perform exposure operations after the closing blades shift from the positions at which they cover the shutter opening of a camera to their starting positions at which they start to open the shutter opening according to the position of the shutter release, said shutter comprising: an actuating member for actuating the closing blades; a closing member which biases the actuating member in the direction to perform an exposure operation; a spring connecting the actuating member with the closing member; a brake lever which, when the actuating member arrives in its exposure end position, brakes the actuating member, the brake lever having a retaining portion that retains the actuating member in its exposure end position; and an anchoring lever having an anchoring portion which, when the actuating member is in its exposure end position, moves out of the operating range of the actuating member. The retaining portion of the brake lever releases the actuating member after the anchoring portion of the anchoring lever moves into the operating range of the actuating member according to the charge upon the shutter.

When the closing member is in its exposure end position, the engagement pin of the closing member bears on the brake lever. Further, the pin is engaged by the retaining portion and retained in the above-described position. Therefore, it is not necessary to lock the actuating member with the anchoring lever. Immediately after the end of photography, the actuating member can be rotated to the left into a given position in which the member is locked. Accordingly, it is not necessary to rotate the actuating member to the left momentarily against a strong tension spring mounted on the actuating member. Consequently, the force P can be made substantially uniform and moderate from the beginning of the stroke until the given position is reached. The force is not required to be increased suddenly.

Other objects and features of the invention will appear in the course of the description thereof which follows.

DETAILED DESCRIPTION OF THE INVENTION

Figure 1:
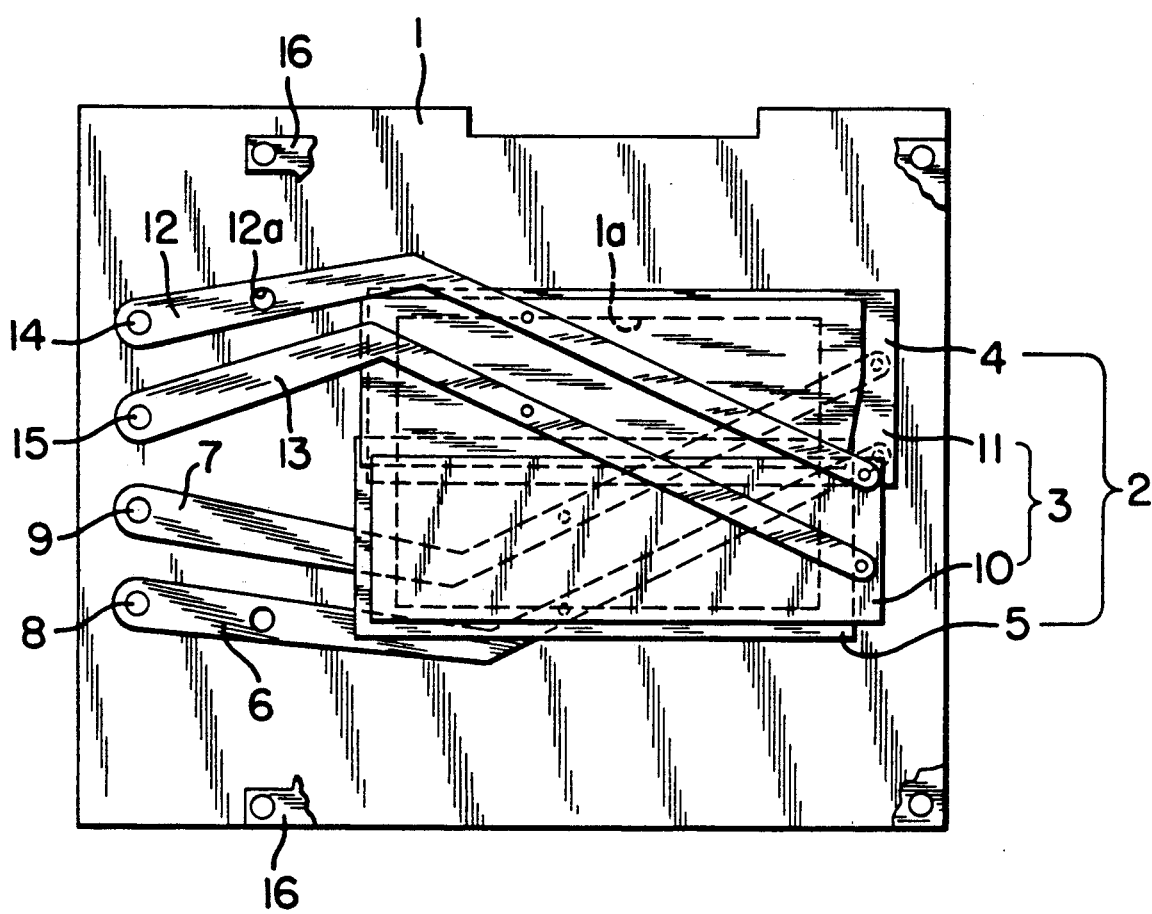
FIG. 1 is a plan view of a focal-plane shutter according to the invention, and in which opening shutter blades and closing shutter blades cover the shutter opening of a camera.

Referring to FIG. 1, there is shown a focal-plane shutter according to the invention, the shutter being installed in a camera. This shutter includes a base plate 1 which is located on the side of the camera lens (not shown) and in front of the surface of the film loaded in the camera. The plate 1 is provided with a shutter opening 1a. An opening shutter blade unit 2 for opening the opening 1a and a closing shutter blade unit 3 for closing the opening 1a are disposed over the base plate 1.

The opening shutter blade unit 2 consists of an opening slit blade 4 and a cover blade 5 which are connected to an opening arm 6 and to an opening auxiliary arm 7 by pins. These arms 6 and 7 form a pair of parallel links. The arms 6 and 7 are rotatably mounted to the base plate 1 by pins 8 and 9, respectively. Similarly, the closing shutter blade unit 3 consists of a closing slit blade 10 and a cover blade 11 which are connected to a closing arm 12 and a closing auxiliary arm 13 by pins. The arms 12 and 13 are parallel links an rotatably mounted to the base plate 1 by pins 14 and 15, respectively.

Figure 2:
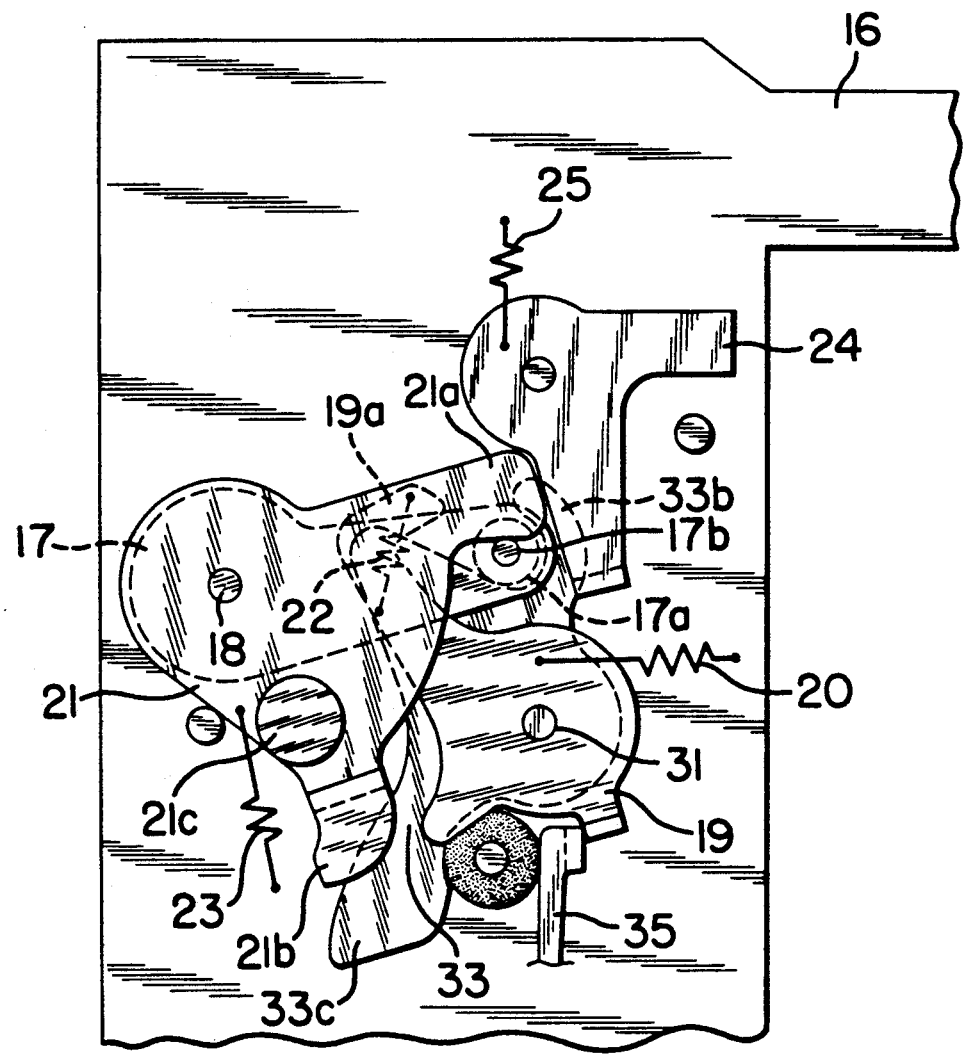
FIG. 2 is a plan view of a mechanism driving the closing shutter blades shown in FIG. 1.

A support plate 16 having an electromagnet (not shown) for controlling exposure time, an actuating spring (not shown), and other driving components thereon is mounted on the base plate 1 on which the opening shutter blade unit 2 and the closing shutter blade unit 3 are disposed. A drive mechanism for driving the closing shutter blade unit 3 is mounted on the support plate 16. As shown in FIG. 2, a closing lever 17, or an actuating member, has a first engagement pin 17a fitted in a hole 12a formed in the closing arm 12. The lever 17 is rotatably held to the support plate 16 via a pivotal pin 18. A second engagement pin 17b that is located on the opposite side of the first engagement pin 17a is mounted to the closing lever 17. An anchoring lever 19 which rotates according to the position of the shutter release can engage the first engagement pin 17a of the closing lever 17. The anchoring lever 19 is mounted to the support plate 16 via a pivotal pin 31.

Figure 3:
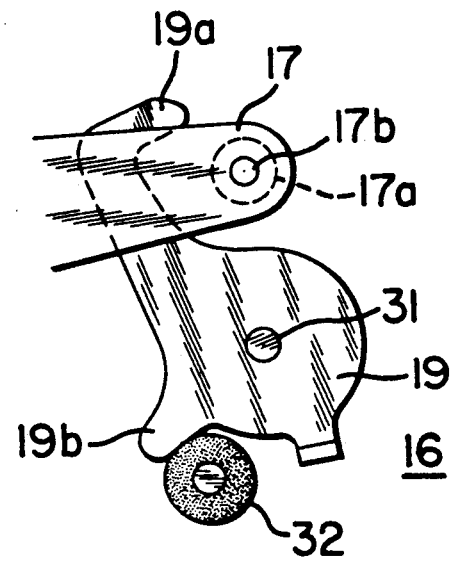
FIG. 3 is a plan view of the anchoring lever shown in FIG. 2.

Referring also to FIG. 3, the anchoring lever 19 has a hooked anchoring portion 19a and an abutment portion 19b. The anchoring portion 19a engages the first engagement pin 17a. When the abutment portion 19b is rotated to the left about the pivotal pin 31, the abutment portion 19b abuts against a stopper 32 mounted on the support plate 16, the stopper 32 being made from a resilient material. When the anchoring lever 19 is rotated to the left by a push member 35 against the pulling force of the first tension spring 20, the lever 19 disengages from the closing lever 17.

Figure 4:
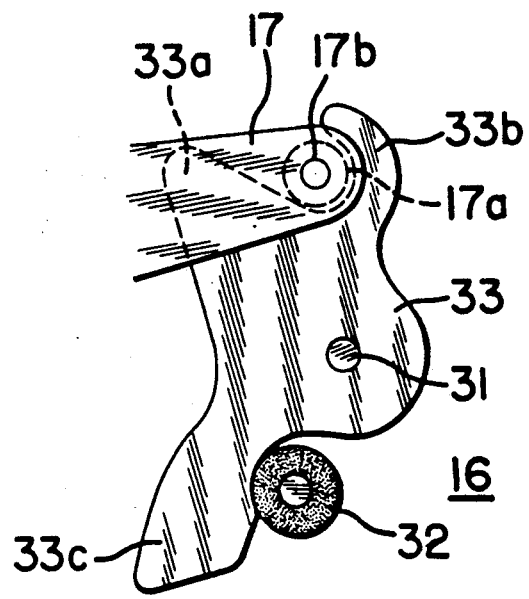
FIG. 4 is a plan view of the brake lever shown in FIG. 2.

A brake lever 33 is mounted double on the support plate 16 via the pivotal pin 31 under the anchoring lever 19. As shown also in FIG. 4, the brake lever 33 is substantially triangular in shape and protrudes. The lever 33 comprises a brake portion 33a, a hooked retaining portion 33b engaging the first engagement pin 17a, and an abutment portion 33c abutting against the stopper 32. When the first engagement pin 17a moves, it collides against the brake portion 33a for the closing lever 17 to be braked.

A driving·lever 21, or a closing member, is rotatably mounted to the pivotal pin 18 together with the closing lever 17. A second tension spring 22, or a connecting spring, is stretched between the driving lever 21 and the closing lever 17. A third tension spring 23 producing a stronger spring force is stretched between the driving lever 21 and the support plate 16. The driving lever 21 is always biased clockwise.

The driving lever 21 is provided with a first engagement protrusion 21a and a second engagement protrusion 21b . As shown in FIG. 3, the first engagement protrusion 21a can engage the second engagement pin 17b mounted to the closing lever 17. The second engagement protrusion 21b can engage a closing claw 24 which is rotatably mounted to the support plate 16.

In the operation of the focal-plane shutter constructed as described above, the opening shutter blade unit 2 and the closing shutter blade unit 3 are operated to exposed the film. After the completion of photography, the closing shutter blade unit 3 which closes the shutter opening 1a must be made openable to enable the next photography.

When photography is completed, the driving lever 21 is in the position shown in FIG. 2. That is, the driving lever 21 and the closing lever 17 are urged to rotate to the right by the pulling force of the third tension spring 23. The first engagement pin 17a bears against the brake portion 33a of the brake lever 33, so that the pin is stopped and engages with the retaining portion 33b . Under this condition, the closing shutter blade unit 3 engaging with the first engagement pin 17a covers the shutter opening 1a double together with the opening shutter blade unit 2. The anchoring lever 19 is forced to rotate to the left by the push member 35 against the pulling force of the first tension spring 20. The anchoring portion 19a of the lever 19 does not engage with the first engagement pin 17a.

In order to place the closing lever 17 in position, the driving lever 21 is rotated to the left by a set lever (not shown) via the pin 21c. Since the retaining portion 33b of the brake lever 33 engages with the first engagement pin 17a, the closing lever 17 is prevented from rotating to the left, though the second tension spring 22 is stretched between the driving lever 21 and the closing lever 17. Therefore, even if the first engaging lever 19 does not engage with the first engagement pin 17a, the closing lever 17 is prevented from turning to the left.

Figure 5:
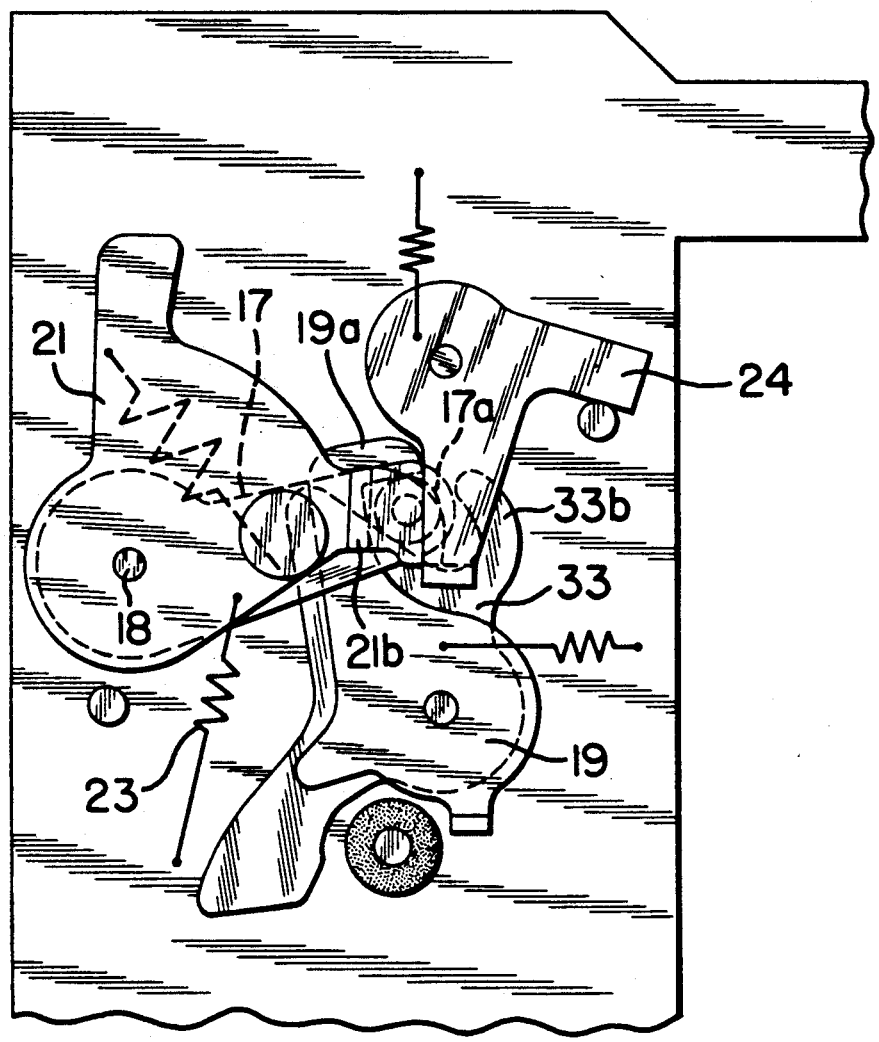
FIGS. 5 and 6 are plan views of the driving mechanism shown in FIG. 2 as well as its associated components, for illustrating the operation of the driving mechanism.

When the retaining portion 33b engages the first engagement pin 17a, if the driving lever 21 is rotated to the left into the given position as shown in FIG. 5, then the closing claw 24 is rotated to the right and brought into engagement with the second engagement protrusion 21b. At this time, the closing lever 17 is placed in position by the pulling force of the second tension spring 22. Then, the anchoring lever 19 is no longer pushed by the push member 35. The anchoring portion 19a of the lever 19 is brought into engagement with the first engagement pin 17a by the pulling force of the first tension spring 20. At the same time, the brake lever 33 is rotated to the right to bring the retaining portion 33b of the lever 33 out of engagement with the first engagement pin 17a.

Figure 6:
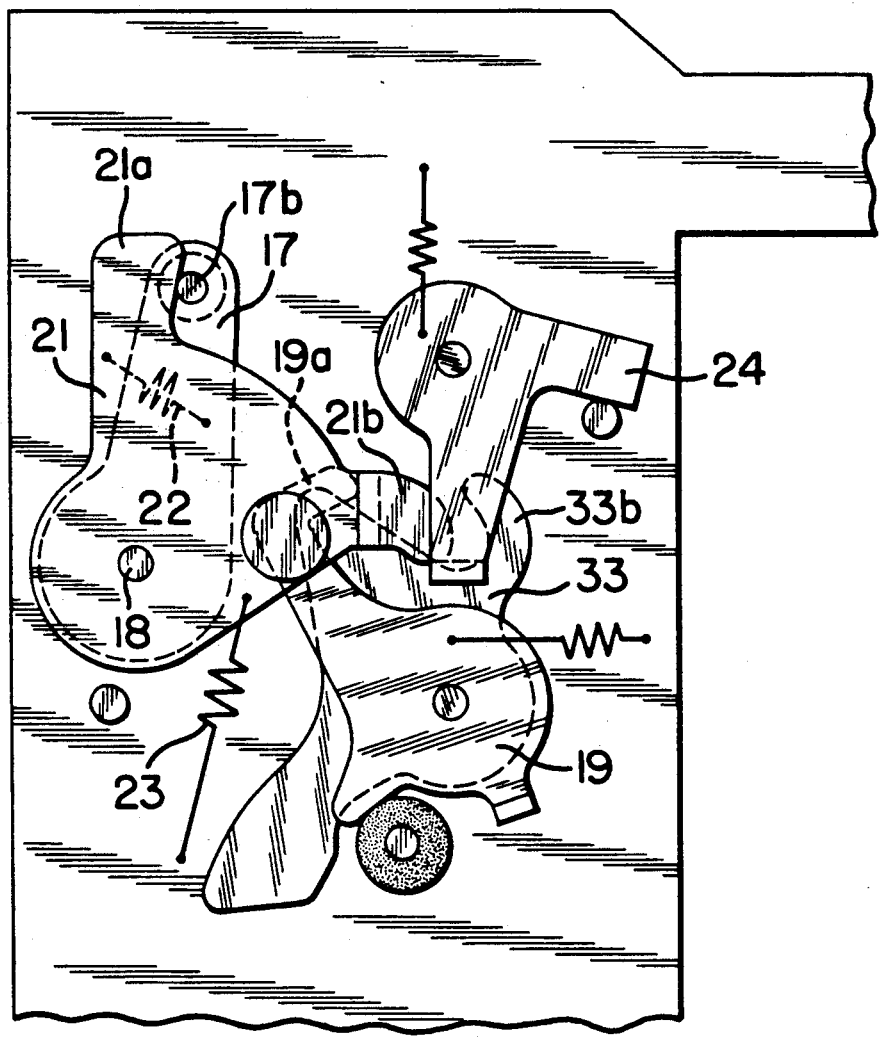

Then, if the shutter release is depressed, the anchoring lever 19 is rotated to the left by the push member 35 to disengage the anchoring portion 19a of the lever 19 from the first engagement pin 17a. Then, the closing lever 17 is rotated to the left by the pulling force on the second tension spring 22 as shown in FIG. 6. The second engagement pin 17b bears on the first engagement protrusion 21a, so that the closing lever 17 comes to a stop. At this time, the closing shutter blade unit engaging with the first engagement pin 17a is actuated. In particular, the unit 3 once moves away from the shutter opening 1a to open it.

Then, the opening shutter blade unit 2 that covers the shutter opening 1a opens the shutter opening 1a. After a given time passes since the opening shutter blade unit 2 is actuated so as to open the opening, the closing claw 24 is rotated to the left against the pulling force of a fourth tension spring 25 and disengages from the driving lever 21. The closing lever 17 is rotated to the right with the driving lever 21 which has the pulling force of the third tension spring 23. The closing arm 14 is also rotated to the right as viewed in FIG. 1 to move the closing slit blade 10 and the cover blade 11 downward. In this way, the rear end of the opening slit blade 4 as viewed in the direction of movement and the front end of the closing blade 10 as viewed in the direction of movement form a slit. This slit moves from the upper end of the shutter opening 1a toward the lower end to expose the film.

Figure 7:
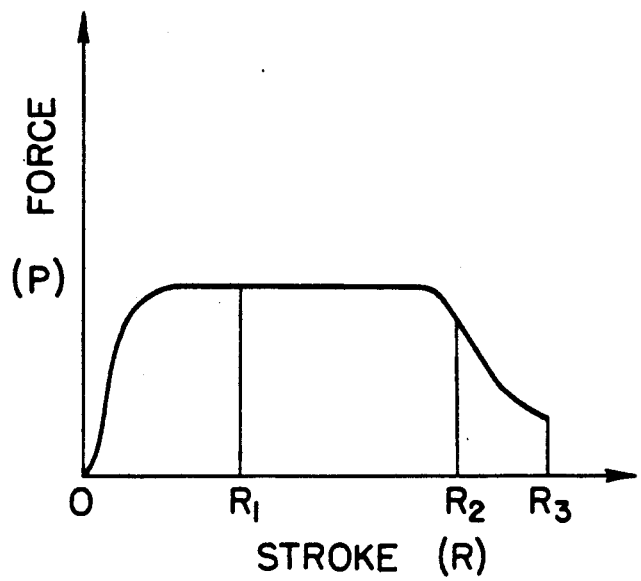
FIG. 7 is a graph in which the force P needed to operate the driving mechanism is plotted against the stroke R traveled.
Figure 10:
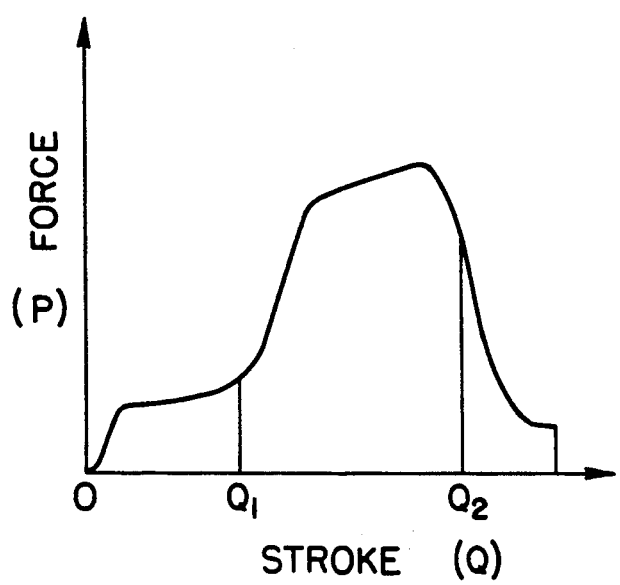
FIG. 10 is a graph in which the force P needed to operate the driving mechanism shown in FIG. 9 is plotted against the stroke Q traveled.
Figure 8:
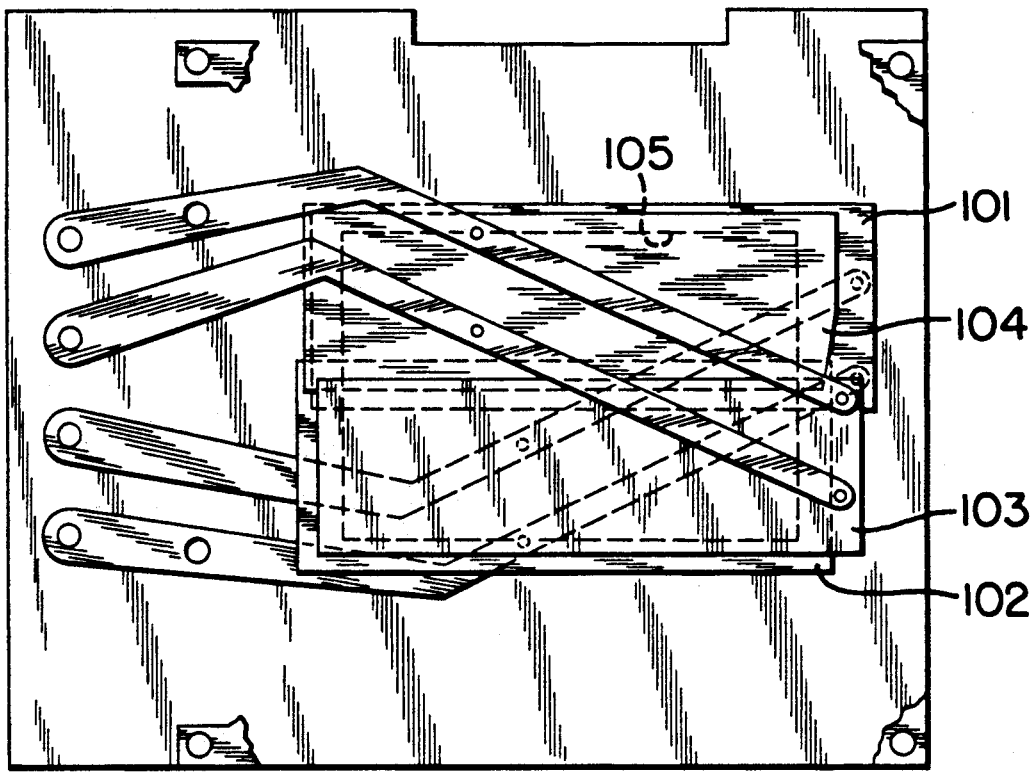
FIG. 8 is a plan view of a conventional focal-plane shutter, and in which opening shutter blades and closing shutter blades cover the shutter opening of a camera.
Figure 9:
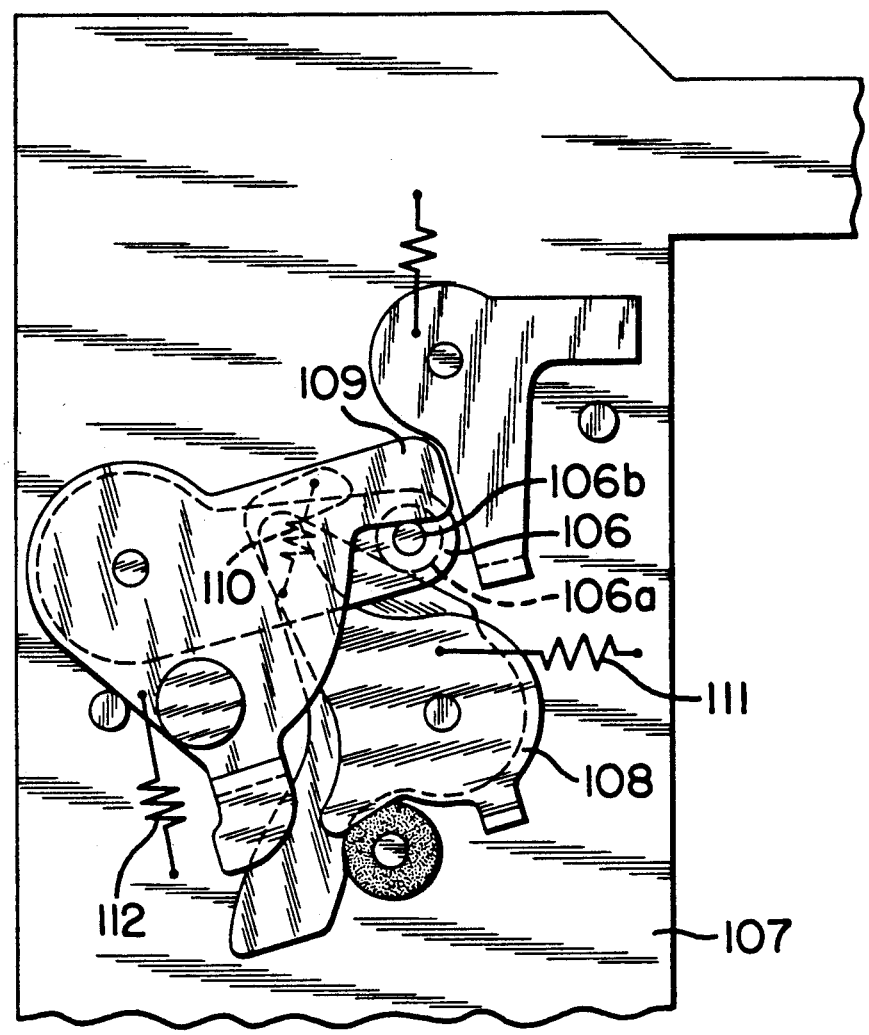
FIG. 9 is a plan view of a mechanism driving the closing shutter blades shown in FIG. 8.

FIG. 7 shows the relation of the force P needed to hold the anchoring lever 19, the driving lever 21, and other components in position to the stroke R traveled. Specifically, when the closing lever 17 is in its exposure end position shown in FIG. 2, the first engagement pin 17a bears on the brake portion 33a of the brake lever 33. In addition, the pin 17a is engaged by the retaining portion 33b of the lever 33 and locked in the above-described position. Therefore, it is necessary that the driving lever 21 be engaged by the anchoring lever 19. Immediately after the end of the photography, the lever 21 is allowed to rotate to the left until it reaches a point $R_3$, where it is locked. Accordingly, it is unnecessary to rotate the driving lever 21 momentarily against the strong third tension spring 23. Hence, the force P can be made substantially uniform in the stroke R which contains an intermediate point $R_1$ and ends with a position $R_2$. Consequently, the force P does not change violently during the stroke R. Where the shutter is driven by a small motor, even if the battery is consumed, it is possible to drive the driving lever 21 and place it in position. Where the shutter is driven manually, no abrupt change occurs in the load and so the force P can be rendered substantially uniform. As a result, any feeling of oddity is not given to the hand.

When the driving lever 21 is held in position after moved into the operating range, the anchoring lever 19 comes into engagement with the closing lever 17 until the point $R_3$ is reached. Subsequently, the retaining portion 33b disengages from the first engagement pin 17a of the closing lever 17.

As described thus, far in accordance with the present invention, the brake lever has the retaining portion that is locked in its exposure end position. After the anchoring portion moves into the operating range of the actuating member according to the charge on the shutter, the retaining portion releases the actuating member. This permits the actuating member to be moved from its photography end position into the operating range at a uniform speed. Therefore, it is not necessary to rotate the actuating member to the left momentarily. Hence, the force can be kept substantially uniform from the beginning of the stroke to the end, and the force does not change suddenly. As a result, where the shutter is driven with a small-sized motor, even if the battery is consumed, the actuating member can be shifted and placed in position. Where the shutter is driven manually, the force does not vary suddenly, but rather it can be made substantially uniform. Thus, any feeling of oddity is not given to the hand.

What is claimed is:

1. A focal-plane shutter having opening blades and closing blades which successively perform exposure operations after the closing blades shift from positions at which they cover the shutter opening of a camera to their starting points at which they start to open the shutter opening according to the position of the shutter release of the camera, said shutter comprising:
    an actuating member for actuating the closing blades;
    a closing member which biases the actuating member in the direction to perform an exposure operation;
    a spring connecting the actuating member with the closing member;
    a brake lever which, when the actuating member arrives in its exposure end position, brakes the actuating member, the brake lever having a retaining portion that retains the actuating member in its exposure end position;
    an anchoring lever having an anchoring portion which, when the actuating member is in its exposure end position, moves out of the operating range of the actuating member;
    and wherein the retaining portion of the brake lever releases the actuating member after the anchoring portion of the anchoring lever moves into the operating range of the actuating member according to the charge upon the shutter.

2. The focal-plane shutter of claim 1, wherein a tension spring is connected with the anchoring lever which usually engages with the actuating member.

3. The focal-plane shutter of claim 2, wherein the first-mentioned spring is a first tension spring, and wherein a third tension spring stronger than the first tension spring is connected with the actuating member normally to bias it clockwise.

* * * * *